May 23, 1961  H. W. BUMP  2,985,406
AIRCRAFT SUSTAINED BY CYLINDRICAL ROTORS
Filed April 29, 1959  2 Sheets-Sheet 1
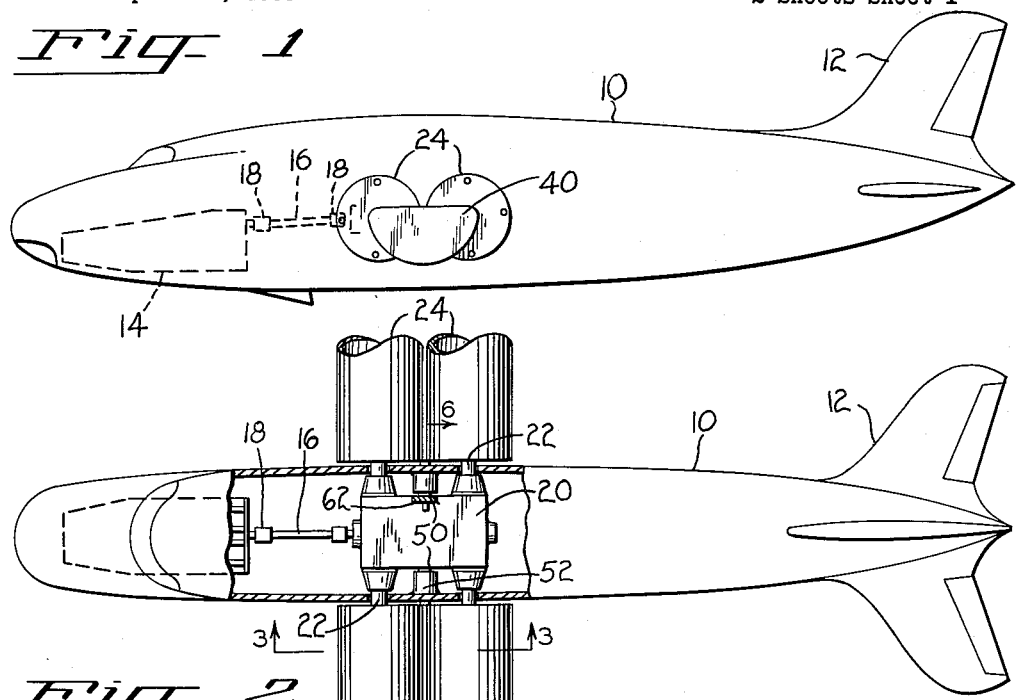
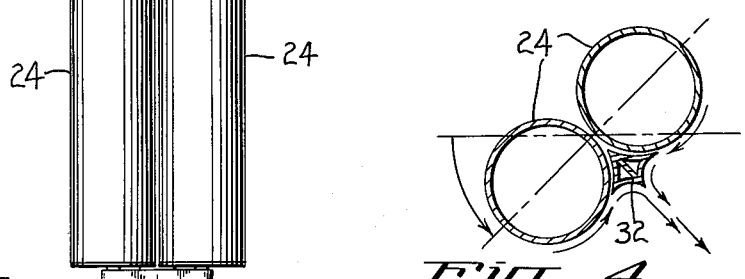
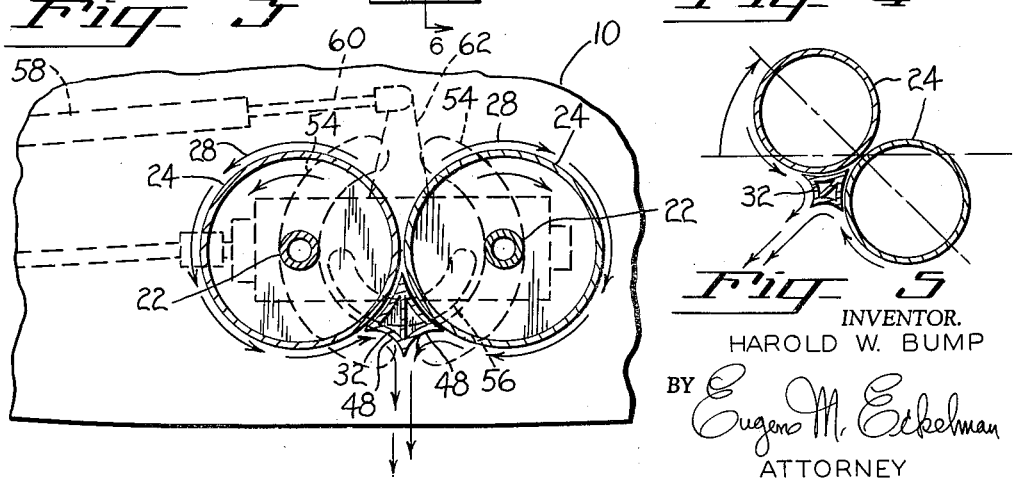
INVENTOR.
HAROLD W. BUMP
BY Eugene M. Eckelman
ATTORNEY

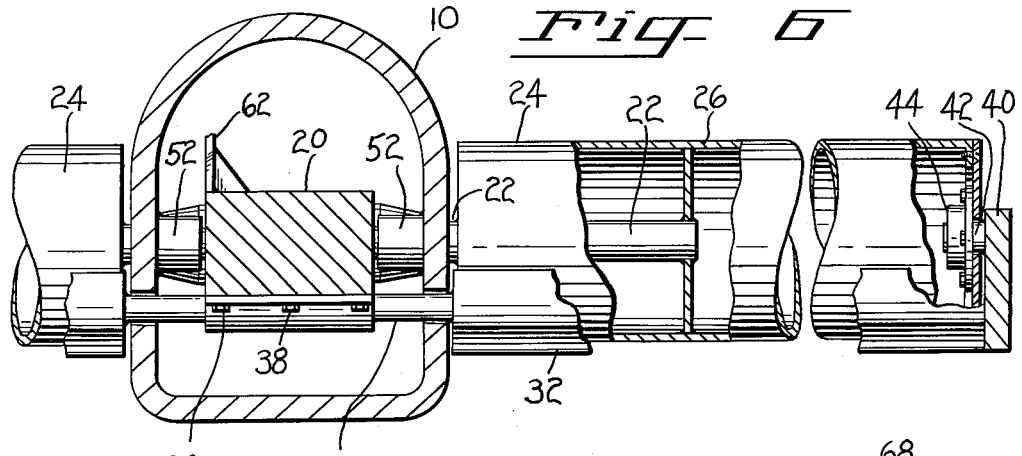
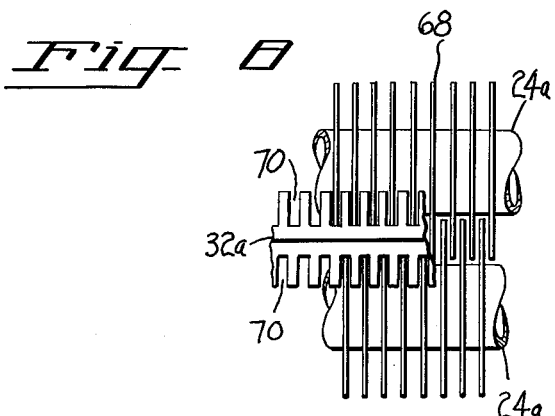
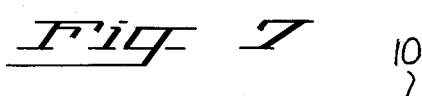
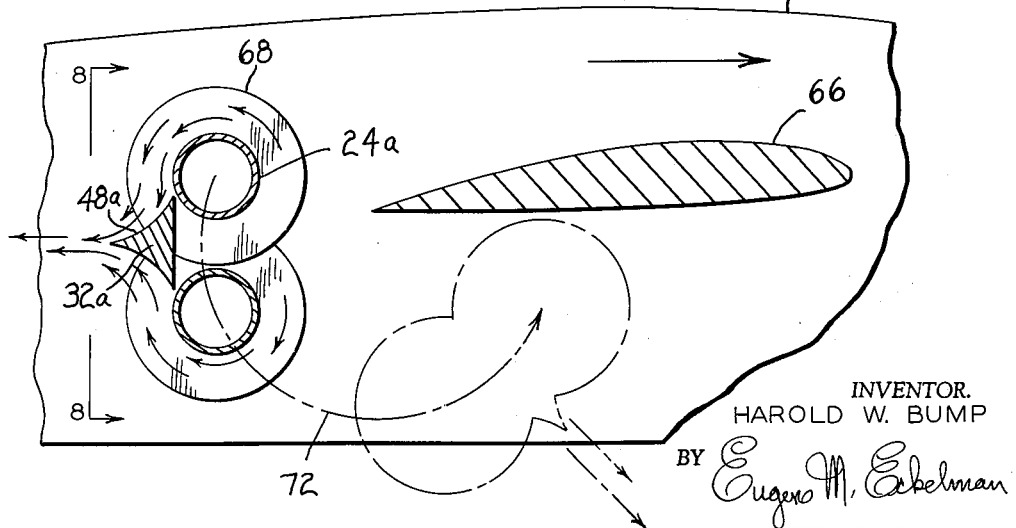

2,985,406
AIRCRAFT SUSTAINED BY CYLINDRICAL ROTORS

Harold Wilson Bump, Rte. 2, Box 84, Monmouth, Oreg.

Filed Apr. 29, 1959, Ser. No. 809,720

7 Claims. (Cl. 244—10)

This invention relates to improvements in heavier than air aircraft and more particularly relates to improved lift and propulsion means for such aircraft.

A primary object of the present invention is to provide lift and propulsion means for aircraft which is substantially silent in operation to thereby eliminate the aggravating noise which is associated with conventional aircraft.

Another object of the present invention is to provide a more favorable lift to drag ratio per power plant horsepower than is possible with conventional aircraft power plants.

Still another object is to provide lift and propulsion means for aircraft which provides for improved maneuverability of said aircraft.

In carrying out the invention, there is employed essentially a similar phenomenon in open air by use of high velocities as is done in closed space by molecular vacuum pumps. The invention is based on the laws of behavior of vortices and more particularly the law which states that two adjacent counter rotating vortices repel each other. In the present case, the vortices are created and held adjacent each other so that the repellant forces therefrom are utilized as a means of propulsion. The invention in one form comprises an aircraft having a fuselage, two closely spaced cylinders disposed with their axes substantially parallel and approximately at right angles to the length of the fuselage and mounted on or supported from the fuselage in a position corresponding substantially to that of the wing or wings of a conventional aircraft, and means for rotating the cylinders to create vortices. Deflector means are preferably employed with the rotating cylinders for intercepting streams of air in the vortices.

The cylinders are capable of adjustment for providing lift and/or forward speed and to accomplish such functions the cylinder assembly is pivotally mounted relative to the fuselage. Means are provided for moving these cylinders so that the axes take up these various positions.

The invention will be better understood and additional objects and advantages will become apparent from the following description taken in connection with the accompanying drawings which illustrate preferred forms of the invention. It is to be understood, however, that the invention may take still other forms and that all such modifications and variations within the scope of the appended claims which will occur to persons skilled in the art are included in the invention.

In the drawings:

Figure 1 is a side elevational view of a heavier than air aircraft utilizing one form of the present lift and propulsion means;

Figure 2 is a fragmentary plan view of Figure 1 with parts broken away to show a drive arrangement for the lift and propulsion means;

Figure 3 is an enlarged sectional view taken on the line 3—3 of Figure 2;

Figure 4 is a diagrammatic view showing a position of pivotal adjustment of the cylinder assembly;

Figure 5 is a view similar to Figure 4 showing another position of adjustment;

Figure 6 is an enlarged sectional view taken on the line 6—6 of Figure 2;

Figure 7 is a fragmentary sectional view showing a second embodiment of the invention; and Figure 8 is an end view taken on the line 8—8 of Figure 7.

Referring now to the drawings, and particularly to Figures 1–6, the numeral 10 designates a heavier than air aircraft fuselage having the usual tail assembly 12. Carried in the aircraft is a conventional power plant 14 which drives a shaft 16 provided with suitable universal joints 18 at opposite ends thereof, and for purposes to be explained the shaft 16 is of a telescoping type whereby the length thereof can be varied.

Shaft 16 is connected to a gear box 20, Figure 2, from which projects oppositely directed pairs of shafts 22. These shafts are integrally connected to drums or cylinders 24, the connection to which being best shown in Figure 6 wherein the shafts project partially into the cylinders and in addition to being integrally connected to the end walls of the cylinders are integrally connected to cross plates 26 within the cylinders.

The power plant 14, operating through gear box 20, rotates the cylinders 24 at a high speed which for the present illustration may approach the speed of sound. The cylinders are rotated in opposite directions as seen by the arrows 28 in Figure 3.

Preferably associated with each pair of cylinders 24 is a deflector or baffle 32 mounted in a stationary position intermediate the cylinders on the lower side thereof. The two deflectors extend in opposite directions from the fuselage and are mounted on a central bar 34, Figure 6, integrally connected to gear box 20 as by a cap member 36 secured in place on the gear box by bolts 38. The oppositely projecting deflectors carry on their opposite ends an end plate 40 carrying a stub shaft 42 on which is rotatably supported by means of a bearing 44 on the outer ends of the cylinders 24.

Referring now particularly to Figure 3, the deflector 32 has a cross sectional configuration assuming substantially a diamond shape so as to fit closely between the cylinders 24 whereby the surface or boundary layer of air in the vortices created by the cylinders is picked up by the latter and efficiently intercepted to accomplish the desired purpose. The lower side of the deflector comprises curved surfaces 48 which upon being impinged by the surface layer of air causes a lifting thrust to be imparted to the aircraft.

Each cylinder assembly, together with its deflector, is pivoted or tilted on a medial axis for the purpose of producing thrust in a vertical direction, in a horizontal direction, or any positions therebetween. For this purpose the gear box 20 is supported on a pair of stub shafts 50 rotatably mounted in bearings 52 integrally mounted on the fuselage. For permitting pivoting movement of the assembly, the shafts 22 project through arcuate slots 54 in the fuselage and the shaft 34 supporting the deflector 32 projects through an arcuate slot 56. This assembly preferably is rotatable through approximately 90° in each direction from its Figure 3 position, whereby the thrust therefrom may be directed in an upward direction, a substantially horizontal direction, and any angular direction therebetween, two of such positions being shown in Figures 4 and 5.

The cylinder assembly and its gear box means is pivoted by means of a fluid cylinder 58, Figure 3, having a connecting rod 60 attached to an upright arm 62 on the gear box 20. Shaft 16, being of telescoping structure, permits pivoting movement of the assembly.

Operation

In the operation of the present invention, the power plant 14 is adapted to rotate the cylinders at high speed in opposite directions and as is well known such a rotating mass creates vortices forming a boundary of air adjacent the cylinders. This boundary of air, upon impingement with deflector 32, imparts a thrust thereagainst to drive the aircraft. As seen in Figure 3, with the axes of the cylinders disposed in horizontal alignment a vertical thrust will be developed to lift the aircraft. If it is desired to impart forward motion as well as a lift to the aircraft the assembly is tilted to its Figure 4 position. The assembly may be tilted to a position whereby the cylinder axes are vertically aligned whereby a maximum forward driving thrust will be applied.

As an illustration of the functionality of the present cylinder assembly it will be assumed that the cylinders are approximately three feet in diameter. This dimension gives the cylinders a circumference of over 100 inches, and as the boundary layer of air builds up to about one inch per 100 linear inches, each cylinder will deliver a flow of 12 cubic inches per lineal foot. At the speed of sound such flow of air will produce a pressure of approximately 25 lbs./sq. in. and this would be 300 lbs./lineal foot of cylinder or 100 lbs./sq. ft. of cross section.

Therefore, the present aircraft may be lifted and propelled forwardly by selected tilted positions of the cylinder assembly. Also, such assembly may be rotated to position the deflector forwardly of the medial axis of said assembly, Figure 5, in relation to Figure 1, whereby a braking effect is applied to the forward motion of the aircraft. It is also within the contemplation of the present invention to provide in the gear means 20 structure to drive the opposite sets of cylinders at different speed so that such means may be used to bank the aircraft.

Although the use of the deflector 32 is desired for increased efficiency, it will be understood that without such deflector a substantial lifting force would nevertheless be present. That is, by means of the high speeds of the cylinders 24, the vortices build up a pressure area between the lower portions of the cylinders and as the pressure is confined in this area an upper thrust is present. Upward pulling forces also exist between the vortices at the upper portion of the cylinders due to the reduction in pressure at this point.

A particular feature of the present lift and propulsion means is that the operation of the cylinders is substantially without noise and therefore dispenses with the nuisance and aggravation existing in connection with conventional aircraft.

Referring now to Figures 7 and 8, there is shown an embodiment wherein the present invention is utilized on an aircraft having a conventional wing 66. Another feature of this embodiment is that each cylinder 24a carries a plurality of closely spaced integral discs or fins 68 which as illustrated in Figure 8 are disposed in staggered relation on the two cllinders so as to overlap. A deflector 32a is disposed intermediate the cylinders 24a and has curved impingement surfaces 48a. For the purpose of intercepting the boundary layers of air on the cylinders 24a the deflector has suitable notches 70 for receiving therebetween the discs 68. Therefore, in this arrangement the discs provide additional surface area for carrying air into the deflector and for illustration purposes an assembly utilizing discs three feet in diameter has a total lift of 600 pounds per square foot of cross section.

The cylinder assembly of Figure 7 is tiltable as a unit on an arc 72, for pivoting the cylinder assembly between the two positions shown to apply thrust in various directions and accomplish desired maneuverability. Normal lift functions are obtained by the wing 66 and propulsion forces are obtained by the cylinders.

It is to be understood of course that the finned cylinders 24a may be utilized on an aircraft not having an air foil as in the Figure 1 embodiment.

Having now described my invention and in what manner the same may be used, what I claim as new and desire to protect by Letters Patent is:

1. Aircraft structure comprising a fuselage, a pair of closely spaced, parallel cylinders rotatably mounted on said fuselage, and drive means for rotating said cylinders in opposite directions to create adjacent vortices and produce a low pressure area therebetween for effecting a lifting thrust.

2. A propellerless aircraft structure comprising a fuselage, a pair of closely spaced, parallel cylinders rotatably mounted on said fuselage, drive means connected to said cylinders for rotating said cylinders in opposite directions whereby said cylinders carry on the surfaces thereof a boundary layer of air comprising the lifting and driving forces for the aircraft, and a stationary deflector disposed intermediate said cylinders for impingement by the boundary layers of air to develop said lifting and driving forces.

3. The aircraft structure of claim 2 wherein said cylinders have a plurality of annular radially disposed discs on their peripheral surfaces assisting in the lifting and driving forces.

4. Aircraft structure comprising a fuselage, lateral wing members on said fuselage to obtain lift of the aircraft, a pair of closely spaced, parallel cylinders rotatably mounted on each side of said fuselage adjacent said wings, drive means connected to said cylinders for rotating said cylinders in opposite directions whereby said cylinders carry on the surfaces thereof a surface layer of air utilized as the propulsion force for the aircraft, and a stationary deflector disposed intermediate said cylinders for impingement by the boundary layers of air to develop said propulsion force for the aircraft.

5. The aircraft structure of claim 4 including means mounting the cylinder assemblies for adjustable rotation as a unit relative to said wings between a horizontal aligned position of said axes and a vertical aligned position of said axes.

6. Aircraft structure comprising a fuselage, a pair of closely spaced, parallel cylinders rotatably mounted on said fuselage, drive means connected to said cylinders for rotating said cylinders in opposite directions whereby said cylinders carry on the surfaces thereof a boundary layer of air, and a stationary deflector disposed intermediate said cylinders for impingement by the boundary layers of air to develop a driving thrust for the aircraft.

7. Aircraft structure comprising a fuselage, a pair of closely spaced, parallel cylinders rotatably mounted on said fuselage, drive means connected to said cylinders for rotating said cylinders whereby said cylinders carry on the surfaces thereof a boundary layer of air, means mounting the cylinders for adjustable rotation as a unit between a horizontal aligned position of said axes and a vertical aligned position of said axes, and a stationary deflector disposed intermediate said cylinders for impingement by the boundary layers of air to develop a driving thrust for the aircraft.

References Cited in the file of this patent

UNITED STATES PATENTS

| | | |
|---|---|---|
| 1,278,750 | Romualdi | Sept. 10, 1918 |
| 2,039,676 | Zaparka | May 5, 1936 |